(12) United States Patent
Fenn et al.

(10) Patent No.: US 7,812,101 B2
(45) Date of Patent: Oct. 12, 2010

(54) MODIFIED EPOXY RESINS COMPRISING THE REACTION PRODUCT OF A BIOMASS DERIVED COMPOUND AND AN EPOXY RESIN, AND AQUEOUS DISPERSIONS AND COATINGS COMPRISING SUCH RESINS

(75) Inventors: David Fenn, Allison Park, PA (US); Geoffrey R. Webster, Gibsonia, PA (US); Gregory J. McCollum, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 633 days.

(21) Appl. No.: 11/780,867

(22) Filed: Jul. 20, 2007

(65) Prior Publication Data

US 2009/0020039 A1    Jan. 22, 2009

(51) Int. Cl.
C08K 3/20 (2006.01)
C08L 63/00 (2006.01)
C08L 63/02 (2006.01)

(52) U.S. Cl. .................. 525/528; 523/402; 523/415; 525/123; 525/124; 525/327.2

(58) Field of Classification Search .................. None
See application file for complete search history.

(56) References Cited

U.S. PATENT DOCUMENTS

| | | |
|---|---|---|
| 2,653,142 A | 9/1953 | Cody |
| 3,057,809 A | 10/1962 | Newey |
| 3,366,563 A | 1/1968 | Hart |
| 3,658,736 A | 4/1972 | Daimer |
| 3,658,738 A | 4/1972 | van Westrenen |
| 3,668,098 A | 6/1972 | Daimer |
| 3,950,286 A | 4/1976 | Hoenel |
| 3,959,198 A | 5/1976 | Broecker |
| 3,966,654 A | 6/1976 | Aldrich |
| 3,971,708 A | 7/1976 | Davis |
| 4,024,095 A | 5/1977 | Broecker |
| 4,188,312 A | 2/1980 | Kempfer |
| 4,219,382 A | 8/1980 | Leffler |
| 4,292,214 A | 9/1981 | Blount |
| 4,434,256 A | 2/1984 | Dworak |
| 4,715,898 A | 12/1987 | Johnson |
| 4,812,508 A | 3/1989 | Makhlouf |
| 4,857,149 A | 8/1989 | Tiedeman |
| 5,021,538 A | 6/1991 | Crews |
| 5,175,250 A | 12/1992 | Hazen |
| 5,272,227 A * | 12/1993 | Munk .................. 525/528 |
| 5,393,337 A | 2/1995 | Nakamura |
| 5,739,184 A | 4/1998 | Marbry |
| 5,767,191 A | 6/1998 | Zawacky |
| 6,060,539 A | 5/2000 | Hermansen |
| 6,229,054 B1 | 5/2001 | Dai |
| 6,262,148 B1 | 7/2001 | Cheng |
| 6,303,676 B1 | 10/2001 | Catena |
| 6,908,995 B2 | 6/2005 | Blount |
| 2008/0121140 A1 | 5/2008 | Fenn |

FOREIGN PATENT DOCUMENTS

| | | |
|---|---|---|
| EP | 0217660 | 4/1987 |
| EP | 0420063 B1 | 4/1991 |
| EP | 0611024 A2 | 8/1994 |
| GB | 1318056 | 5/1973 |
| GB | 1524407 | 9/1978 |
| GB | 2237019 | 4/1991 |
| JP | 54135007 A | 10/1979 |
| JP | 59-59761 A * | 4/1984 |
| JP | 62025182 A | 2/1987 |
| JP | 62192476 A | 8/1987 |
| JP | 04202413 A | 7/1992 |
| JP | 05097968 A | 4/1993 |
| JP | 7-157526 A * | 6/1995 |
| JP | 07179565 A | 7/1995 |
| JP | 2001233947 | 8/2001 |
| KR | 100559055 B | 3/2006 |
| WO | 87/0448 | 7/1987 |
| WO | 0138446 A1 | 5/2001 |
| WO | 02/04084 A2 | 1/2002 |
| WO | 2004031306 A1 | 4/2004 |

OTHER PUBLICATIONS

Wadhwani, Meena et al., "Electrophoretic Coatings based on Phenolic Resins", Asian Journal of Chemistry, 1994, pp. 67-71, vol. 6, No. 1, Ghazlabad, India.

Vargiu, S. et al., "Air drying epoxy-phenolic systems", FATIPEC Congress, 1978, pp. 529-533,14.

Mustata, Fanica et al., "Polyhydroxyetheresters from the restin acids", Polimery 2005; 2004, pp. 176-181, 50, No. 3.

Das et al., "Bio oil from pyrolysis of cashew nut shell-characterisation and related properties", Biomass and Bioenergy, 2004, pp. 265-275, vol. 27, Elsevier Ltd.

(Continued)

*Primary Examiner*—Robert Sellers
(74) *Attorney, Agent, or Firm*—Diane R. Meyers

(57) ABSTRACT

Modified epoxy resins comprising the reaction product of a cycloaliphatic, polycyclic and/or aromatic biomass derived compound and an epoxy resin are disclosed. Aqueous dispersions and coatings comprising these reaction products are also disclosed.

8 Claims, No Drawings

OTHER PUBLICATIONS

Lora et al., "Recent Industrial Applications of Lignin: A Sustainable Alternative to Nonrenewable Materials", Journal of Polymers and the Environment, Apr. 2002; pp. 39-48, vol. 10, Nos. 1/2, Plenum Publishing Corporation.

Sun et al., "Comparative study on the curing kinetics and mechanism of a lignin-based-epoxy/anhydride resin system", Polymer, Dec. 19, 2006; pp. 330-337, vol. 48, No. 1, Elsevier Science Publishers B.V., Great Britain.

Panda, Himadri et al., "Studies on speciality monomers from rosin", paintindia, Jun. 2002; pp. 67-76, Metrocoat Rajapalayam (P) LTD., Tamil Nadu, India.

Ramasri, M. et al., "New binders for cathodic electrodeposition from epoxy resins", Journal of the Oil and Color Chemists' Association, 1986, vol. 69, No. 9, pp. 248-251, Oil and Color Chemists' Association, London, United Kingdom.

* cited by examiner

MODIFIED EPOXY RESINS COMPRISING THE REACTION PRODUCT OF A BIOMASS DERIVED COMPOUND AND AN EPOXY RESIN, AND AQUEOUS DISPERSIONS AND COATINGS COMPRISING SUCH RESINS

FIELD OF THE INVENTION

The present invention relates generally to modified epoxy resins and aqueous dispersions and coatings comprising such resins.

BACKGROUND OF THE INVENTION

The price of raw materials used in many manufacturing processes continues to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a modified epoxy resin comprising the reaction product of a cycloaliphatic, polycyclic and/or aromatic biomass derived compound having less than two epoxy reactive functional groups and an epoxy resin.

The present invention is further directed to an aqueous dispersion comprising such a resin.

The present invention is further directed to a coating comprising such as resin.

DETAILED DESCRIPTION OF THE INVENTION

The present invention is directed to a modified epoxy resin comprising the reaction product of a cycloaliphatic, polycyclic and/or aromatic biomass derived compound having less than two epoxy reactive functional groups ("biomass derived compound") and an epoxy resin. An "epoxy reactive functional group" is a group that reacts with epoxy. It will be appreciated that such cycloaliphatic, polycyclic or aromatic compounds might actually comprise a blend of compounds, some of which may have less than two epoxy reactive functional groups, and some of which may have two or more epoxy reactive functional groups. On average, the compound will have less than two of such groups. In certain embodiments, the average number of epoxy reactive functional groups is one. The reaction product of the biomass derived compound and the epoxy resin is sometimes referred to herein as the "modified epoxy", "modified epoxy resin" and like terms.

A biomass derived compound will be understood to be a compound derived from a living or recently living organism, for example plants (including trees) or animals and not from a petroleum based source. The biomass derived compound used according to the present invention is typically 50 weight percent or greater biomass derived; that is less than 50 weight percent can comprise non-biomass material, such as petroleum derived material. A cycloaliphatic compound is one that comprises a non-aromatic, carbon-based ring, an aromatic compound is one that comprises an aromatic ring, and a polycyclic compound comprises two or more rings, which can be non-aromatic and/or aromatic. Examples of cycloaliphatic, polycyclic or aromatic biomass derived compounds having less than two epoxy reactive functional groups include rosin and cardanol.

"Rosin" actually comprises a mixture of compounds, with abietic acid often being predominant (i.e. more abietic acid than any other component). Rosin is commercially available as, for example, gum rosin, wood rosin, and tall oil rosin. Abietic acid may be used according to the present invention in its natural form or it may be purified using techniques known to those skilled in the art before being used. In its natural form as a rosin or rosin acid, the abietic acid may be present with isomeric forms such as levoprimaric and resin acids of the pimaric type. Oleoresin material can also be present, as can dihydroabietic acid and dehydroabietic acid. Since rosin is a complex mixture of mainly twenty carbon atom fused ring, mono-carboxylic acids and a small amount of nonacidic components, where the resin acid molecule has the double bonds and the carboxylic acid group, any derivative can be used that maintains the carboxylic acid group. For example, hydrogenated derivatives of the oleoresin and rosin can be used. One suitable example of rosin that can be used is SYLVAROS NCY, a tall oil rosin from Arizona Chemical, and another is Brazilian Gum rosin from Gehring-Montgomery.

"Cardanol" is derived from cashews. It is the principal component of cashew nut shell liquid (CNSL), an oil isolated from the shell of the cashew nut. The structure of cardanol, a phenol with a C15 aliphatic side chain in the meta position, is shown below. The aliphatic side chain contains an average of about two unsaturated bonds. Cardanol is available from Cardolite Corporation as CARDOLITE NC-700.

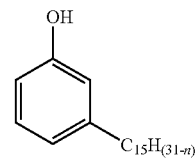

n = 0, 2, 4 or 6

The biomass derived compound has an average epoxy reactive functionality of less than two, such as one, as noted above. The functional group is one that can react with an epoxy group. The biomass derived compound can further comprise additional functionality that is not epoxy reactive. This compound is reacted with an epoxy resin according to the present invention. In certain embodiments, the epoxy resin has at least two epoxy functionalities. A portion of the epoxy functionality will react with the functional group on the compound from a renewable resource to form the present modified epoxy resin, and a portion will remain unreacted.

Suitable epoxy resins include but are not limited to those having a 1,2-epoxy equivalency greater than one, such as at least two; that is, polyepoxides that have on average two epoxide groups per molecule. In general, the epoxide equivalent weight of the polyepoxide can range from 100 to 2000, such as from 180 to 1200 or 180 to 500. The epoxy resins may be saturated or unsaturated, cyclic or acyclic, aliphatic, alicyclic, aromatic or heterocyclic. It may contain substituents such as halogen, hydroxyl, and/or ether groups. Particularly suitable polyepoxides are polyglycidyl ethers of polyhydric alcohols, such as cyclic polyols, such as polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Other cyclic polyols can also be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl)cyclohexane. Epoxy group-containing acrylic polymers can also be used. These polymers typically have an epoxy equivalent weight ranging from about 750 to 2000. Because a portion of the epoxy functionality remains unreacted, the modified epoxy resin is epoxy functional. "Epoxy functional", and like terms, as used herein refer to a compound or polymer having at least one unreacted epoxy group. This epoxy group can undergo reaction with, for example, a carboxylic acid to form an ester bond, with a primary amine to form a secondary amine or with a secondary amine to form a tertiary amine. In this manner, the modified epoxy resin used according to the present invention can be crosslinked or can otherwise form at least a portion of a coating.

The biomass derived compound and epoxy resin can be reacted by any method known in the art. It will be appreciated that the type of reaction will depend on the functionality and/or other characteristics of the mono-functional compound. The reaction can be carried out neat or in the presence of an inert organic solvent; any suitable solvent can be used such as a ketone, including methyl isobutyl ketone and/or methyl amyl ketone; aromatics such as toluene and/or xylene; and/or glycol ethers such as the dimethyl ether of diethylene glycol. The reaction is typically conducted at a temperature of 80° C. to 160° C. for 30 to 180 minutes until an epoxy group-containing resinous reaction product is obtained. Alternatively the reaction can be carried out in a continuous reactor and can be conducted at a temperature of 140° C. to 280° C. for 1 to 20 minutes. The equivalent ratio of reactants, i.e., epoxy groups:epoxy reactive groups, is typically 1.00:0.20 to 1.00:0.80.

It will be appreciated that when the epoxy reactive functional group of the biomass derived compound reacts with the epoxy group, the epoxy ring will open and a hydroxy group will be formed. This hydroxy group can be further reacted with a compound having one or more hydroxy reactive groups. A hydroxy reactive group is a group that reacts with hydroxy. This increases the molecular weight of the modified epoxy resin. Increased molecular weight can result in increased performance, such as increased solvent resistance, corrosion resistance, hardness and/or stability. The compound having one or more hydroxy reactive groups can be a polyisocyanate. Suitable polyisocyanates include, but are not limited to, aliphatic diisocyanates like hexamethylene diisocyanate and isophorone diisocyanate and aromatic diisocyanates like toluene diisocyanate and 4,4'-diphenylmethane diisocyanate. Examples of other suitable polyisocyanates include, but are not limited to, isocyanurate trimers, allophanates, and uretdiones of diisocyanates. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include LUPRANATE M20S, sold by BASF Corporation, DESMODUR N3390, sold by Bayer Corporation, and TOLONATE HDT90 which is sold by Rhodia Organics.

Typically, the biomass derived compound can comprise 5 to 60 wt %, such as 25 to 50 wt % of the total solids weight of the modified epoxy. The epoxy resin can comprise 20 to 95 wt %, such as 30 to 60 wt % of the modified epoxy. When isocyanate is used, it can be present in amounts ranging from 1 to 10 wt %, such as 3 to 6 wt %, based on total solids weight of the modified epoxy resin. "Modified epoxy", "modified epoxy resin" and like terms, include the reaction product of the biomass derived compound and an epoxy resin further reacted with isocyanate, in the embodiments wherein isocyanate used.

The present invention is further directed to an aqueous dispersion comprising any of the modified epoxy resins described above. Dispersions can be prepared by converting unreacted epoxy groups in the modified epoxy resin to cationic or anionic groups. In certain embodiments the unreacted epoxy groups are converted to cationic salt groups. Cationic salt groups can be introduced by the reaction of epoxy functionality on the modified epoxy resin with appropriate salt forming compounds. For example, sulfonium salt groups can be introduced by reacting a sulfide in the presence of an acid, as described in U.S. Pat. Nos. 3,959,106 and 4,715,898 hereby incorporated by reference; amine salt groups can be derived from the reaction of epoxy functionality on the modified epoxy resin with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The amine groups can then be at least partially neutralized with an acid. Suitable acids include organic and inorganic acids such as formic acid, acetic acid, lactic acid, phosphoric acid, dimethylolpropionic acid, sulfamic acid and mixtures thereof. The resulting modified epoxy resin can contain primary, secondary and/or tertiary amino groups.

The modified epoxy resin comprising cationic or anionic groups can be dispersed in a dispersing medium, such as water. The dispersion step may be accomplished by combining the neutralized or partially neutralized modified epoxy resin with the dispersing medium. Neutralization and dispersion can be accomplished in one step by combining the resin and the dispersing medium, or by any other means known in the art. The modified epoxy resin can be added to the dispersing medium or the dispersing medium can added to the resin (or its salt). In certain embodiments, the pH of the dispersion is within the range of 4 to 9. The modified epoxy can comprise 5 to 60 wt %, such as 10 to 50 wt % of the aqueous dispersion, with weight percent based on the total weight of the dispersion.

It will be appreciated that, when the cycloaliphatic, polycyclic and/or aromatic biomass derived compound having less than two epoxy reactive functional groups is rosin, the reaction with the epoxy resin will result in the formation of an ester group. Ester groups typically undergo hydrolysis in water. It was a surprising discovery that the ester groups in the modified epoxy resins of the present invention are substantially water stable. By "substantially water stable" is meant that no substantial change in acid value or molecular weight is observed when an aqueous dispersion of the modified epoxy resin is stored for one month at 40° C.

The present invention is further directed to a coating comprising any of the modified epoxy resins described herein. A "coating" according to the present invention will generally be understood as a composition that, when cured, can form a substantially continuous film or layer. The coatings of the present invention can comprise 5 to 100 wt %, such as 10 to 95 or 20 to 90 wt %, based on total solids weight, of the modified epoxy resin. When these modified epoxies are used in a coating, the coating may comprise 10 wt % or greater of the compound from a renewable resource, such as 20 wt % or greater, or 30 wt % or greater, with wt % based on total solids weight.

It will be appreciated that when the present modified epoxy resins are used in a coating according to the present invention, they can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, may be in solid particulate form, i.e., a powder coating.

Thermosetting or curable coating compositions typically comprise film forming polymers or resins having functional groups that are reactive with either themselves or a crosslinking agent. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. In certain embodiments, the use of hydroxy free drying and/or semi drying fatty acid esters and/or oil esters is specifically excluded.

Appropriate mixtures of film-forming resins may also be used in the preparation of the coating compositions.

The thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. In certain embodiments, the modified epoxy resin can be self crosslinking. Self crosslinking means that the reaction product contains functional groups that are capable of reacting with themselves, such as alkoxysilane groups, or that the reaction product contains functional groups that are coreactive, for example hydroxyl groups and blocked isocyanate groups. In certain embodiments, blocked isocyanate groups can be introduced into the modified epoxy resin by reacting residual epoxy groups with the reaction product of a polyamine containing primary and secondary amine groups and an acyclic carbonate as described in WO 2006110515, incorporated by reference herein.

In certain embodiments, the present coatings are not cationic electrodepositable coatings. A cationic ecoat will be understood as one in which cationic salt groups are introduced by the reaction of the epoxy group with appropriate salt forming compounds. For example, certain embodiments specifically exclude a cationic ecoat in which the biomass derived compound comprises rosin, and the rosin forms part of the cationic resin backbone. That is, rosin or its derivatives will not be in the backbone of the resin.

The present invention is further directed to a cationic electrodepositable coating composition comprising a modified epoxy resin comprising the reaction product of a cycloaliphatic, polycyclic and/or aromatic biomass derived compound and an epoxy resin wherein the biomass derived compound does not comprise rosin and/or a residue of rosin that forms part of the cationic resin backbone. In certain embodiments, the biomass derived compound comprises cardanol and/or a residue of cardanol. By "residue" is meant the residue of a compound that remains after reaction, or that gets incorporated into a reaction product. As noted above, the present coatings in certain embodiments are electrodepositable, and they contain cationic salt groups. Accordingly, the modified epoxy should be capable of being converted into a cationic salt group, or otherwise be reactive with another coating component capable of being converted into a cationic salt group. For example, the modified epoxy can have epoxy functionality, which can be converted to a cationic salt group. Cationic salt groups can be introduced by any means known in the art, such as by the reaction of an epoxy group-containing reaction product of the types described above with appropriate salt forming compounds. For example, sulfonium salt groups can be introduced by reacting a sulfide in the presence of an acid, as described in U.S. Pat. Nos. 3,959,106 and 4,715,898, incorporated by reference herein; amine salt groups can be derived from the reaction of an epoxide functional reaction product with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The cationic salt groups can be at least partially neutralized with an acid. Suitable acids include organic and inorganic acids such as formic acid, acetic acid, lactic acid, phosphoric acid, dimethylolpropionic acid and sulfamic acid. Mixtures of acids can be used. The resin can contain primary, secondary and/or tertiary amino groups.

It will be appreciated that in formulating electrodepositable coating compositions according to the present invention, the biomass derived compound as described above can be dispersed in a dispersing medium. The dispersing medium can be water. The dispersion step may be accomplished by combining the neutralized or partially neutralized biomass derived compound with the dispersing medium. Neutralization and dispersion can be accomplished in one step by combining the biomass derived compound and the dispersing medium. The reaction product described above can be added to the dispersing medium or the dispersing medium can added to the reaction product (or its salt). In certain embodiments, the pH of the dispersion is within the range of 4 to 9. The dispersion can be formed at a suitable solids level for the final coating, for example 5 to 15 weight percent, or it can be formed at higher solids, for example 20 to 45 weight percent, to minimize the weight and volume of material that needs to be stored and/or transported. The dispersion can then be adjusted to a suitable solids level for coating prior to use. Alternatively the resin, optionally blended with the crosslinker, can be stored and transported as an organic solution and dispersed shortly before use. Suitable conditions for forming such stable dispersions include those set forth in the Examples.

The biomass derived compound-containing cationic salt resin according to the present invention can then be used in an ecoat like any other cationic salt known in the art. The biomass derived compound-containing cationic salt can comprise 10 to 90 weight percent, such as 10 to 60 weight percent of the ecoat. In certain embodiments, the ecoat can further comprise one or more other resins commonly used in electrodepositable coatings. Examples include a cationic acrylic resin, such as one derived from an epoxy functional acrylic resin, or the film-forming resins discussed above. In certain embodiments of the present invention the coatings specifically exclude rubber, such as alkene or modified alkene rubbers.

The coating compositions may also include a solvent. Suitable solvents include water, organic solvent(s) and/or mixtures thereof. Suitable solvents include glycols, glycol ether alcohols, alcohols, ketones, and aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane, Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 wt % of the present compositions, such as from 3 to 40 wt % or 5 to 35 wt %, with weight percent based on the total weight of the composition.

It will be further appreciated that the coating described herein can be either "one component" ("1K"), "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coating in which various components are maintained separately until just prior to application.

As stated above, in certain embodiments, the modified epoxy of the present invention can react with, and become part of the film-forming resin of the coating. That is, the modified epoxy resin described herein will react, thereby contributing to the cure of the coating.

The present coatings can be applied to any substrates known in the art for example automotive substrates and industrial substrates. These substrates can be, for example, metallic, polymeric, transparent plastic substrates, polycarbonate, wood substrates and the like.

The coatings of the present invention can be applied by any means standard in the art such as electrocoating, spraying, electrostatic spraying, dipping, rolling brushing, and the like.

The coatings can be applied to a dry film thickness of 0.1 to 5.0 mils, such as 0.5 to 3.0 or 0.9 to 2.0 mils. The coatings of the present invention can be used alone, or in combination with other coatings. For example, the coatings can be pigmented or unpigmented, and can be used as a primer, e-coat, base coat, top coat, automotive repair coat and the like. For substrates coated with multiple coatings, one or more of those coatings can be coatings as described herein.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein, including the claims, to "a" biomass derived compound, "an" epoxy resin, "a" polyisocyanate, "an" isocyanate, "a" modified epoxy resin and the like, one or more of each of these and any other components can be used. "Including" means "including, but not limited to". As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

|   |   | Mass (/g) |
|---|---|---|
| 1 | EPON 828[1] | 483.61 |
| 2 | gum rosin[2] | 528.92 |
| 3 | ethyltriphenyl phosphonium iodide | 0.69 |
| 4 | methyl isobutyl ketone | 58.97 |
| 5 | MDI[3] | 52.03 |
| 6 | methyl isobutyl ketone | 63.03 |
| 7 | crosslinker prepared as described below | 389.77 |
| 8 | DETA diketimine[4] | 30.46 |
| 9 | N-methyl ethanolamine | 6.10 |
| 10 | methyl isobutyl ketone | 2.30 |

[1]Glycidyl ether of Bisphenol A, available from Resolution.
[2]Brazilian gum rosin, available from Gehring-Montgomery.
[3]LUPRANATE M20S, available from BASF Corp.
[4]Diketimine formed from diethylene triamine and methylisobutyl ketone (72.69% solids in methylisobutyl ketone).

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (727.1 g) was dispersed in aqueous medium by adding it to a mixture of 21.29 g of sulfamic acid and 361.45 g of deionized water warmed to 30° C. under vigorous agitation. After 30 minutes, 6.09 g of a 30% solution of gum rosin in butylcarbitol formal was added followed, 45 minutes later by 557.99 g of deionized water. The dispersion was thinned with more deionized water and vacuum stripped to remove organic solvent to give a dispersion having a solids content of 45.7 percent. The reaction product had Z average molecular weight of 28 358 (determined by gel permeation chromatography in DMF using polystyrene as a standard).

Example 2

|   |   | Mass (/g) |
|---|---|---|
| 1 | EPON 828 | 479.14 |
| 2 | gum rosin | 524.02 |
| 3 | ethyltriphenyl phosphonium iodide | 0.68 |
| 4 | methyl isobutyl ketone | 58.42 |
| 5 | MDI | 64.43 |
| 6 | methyl isobutyl ketone | 77.34 |
| 7 | crosslinker | 386.16 |
| 8 | DETA diketimine | 30.18 |

-continued

| | | Mass (/g) |
|---|---|---|
| 9 | N-methyl ethanolamine | 6.04 |
| 10 | methyl isobutyl ketone | 2.28 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (732.9 g) was dispersed in aqueous medium by adding it to a mixture of 21.09 g of sulfamic acid and 355.82 g of deionized water warmed to 30° C. under vigorous agitation. After 30 minutes, 6.09 g of a 30% solution of gum rosin in butylcarbitol formal was added followed, 45 minutes later by 557.96 g of deionized water. The dispersion was thinned with more deionized water and vacuum stripped to remove organic solvent to give a dispersion having a solids content of 42.7 percent. The reaction product had Z average molecular weight of 43 489 (determined by gel permeation chromatography in DMF using polystyrene as a standard).

Example 3

| | | Mass (/g) |
|---|---|---|
| 1 | EPON 828 | 473.88 |
| 2 | gum rosin | 518.28 |
| 3 | ethyltriphenyl phosphonium iodide | 0.68 |
| 4 | methyl isobutyl ketone | 57.78 |
| 5 | MDI | 76.61 |
| 6 | methyl isobutyl ketone | 91.77 |
| 7 | crosslinker | 381.93 |
| 8 | DETA diketimine | 29.84 |
| 9 | N-methyl ethanolamine | 8.36 |
| 10 | methyl isobutyl ketone | 2.25 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (738.6 g) was dispersed in aqueous medium by adding it to a mixture of 20.86 g of sulfamic acid and 350.28 g of deionized water warmed to 30° C. under vigorous agitation. After 30 minutes, 6.09 g of a 30% solution of gum rosin in butylcarbitol formal was added followed, 45 minutes later by 557.93 g of deionized water. The dispersion was thinned with more deionized water and vacuum stripped to remove organic solvent to give a dispersion having a solids content of 40.2 percent. The reaction product had Z average molecular weight of 72 971 (determined by gel permeation chromatography in DMF using polystyrene as a standard).

Example 4

| | | Mass (/g) |
|---|---|---|
| 1 | EPON 828 | 470.62 |
| 2 | gum rosin | 557.14 |
| 3 | ethyltriphenyl phosphonium iodide | 0.70 |
| 4 | methyl isobutyl ketone | 59.86 |
| 5 | MDI | 76.72 |
| 6 | methyl isobutyl ketone | 96.79 |
| 7 | crosslinker | 336.28 |
| 8 | DETA diketimine | 39.42 |
| 9 | N-methyl ethanolamine | 3.68 |
| 10 | methyl isobutyl ketone | 2.34 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (739.6 g) was dispersed in aqueous medium by adding it to a mixture of 16.72 g of sulfamic acid and 347.59 g of deionized water warmed to 30° C. under vigorous agitation. After 30 minutes, 6.10 g of a 30% solution of gum rosin in butylcarbitol formal was added followed, 45 minutes later by 555.00 g of deionized water. The dispersion was thinned with more deionized water and vacuum stripped to remove organic solvent to give a dispersion having a solids content of 44.0 percent. The reaction product had Z average molecular weight of 55 815 (determined by gel permeation chromatography in DMF using polystyrene as a standard).

Example 5

| | | Mass (/g) |
|---|---|---|
| 1 | EPON 828 | 313.18 |
| 2 | Rosin S[5] | 342.52 |
| 3 | ethyltriphenyl phosphonium iodide | 0.45 |
| 4 | methyl isobutyl ketone | 38.19 |
| 5 | MDI | 42.75 |
| 6 | methyl isobutyl ketone | 47.84 |
| 7 | crosslinker | 270.49 |
| 8 | DETA diketimine | 19.72 |
| 9 | N-methyl ethanolamine | 3.95 |
| 10 | methyl isobutyl ketone | 1.49 |

[5]Tall oil rosin, available from MeadWestvaco.

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (972.51 g) was dispersed in aqueous medium by adding it to a mixture of 27.58 g of sulfamic acid and 471.83 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 38.1 percent. The reaction product had Z average molecular weight of 11 710 (determined by gel permeation chromatography in DMF using polystyrene as a standard).

Example 6

|  |  | Mass (/g) |
|---|---|---|
| 1 | EPON 828 | 316.89 |
| 2 | SYLVAROS NCY[6] | 338.80 |
| 3 | ethyltriphenyl phosphonium iodide | 0.45 |
| 4 | methyl isobutyl ketone | 38.19 |
| 5 | MDI | 42.75 |
| 6 | methyl isobutyl ketone | 47.84 |
| 7 | crosslinker | 270.49 |
| 8 | DETA diketimine | 19.72 |
| 9 | N-methyl ethanolamine | 3.95 |
| 10 | methyl isobutyl ketone | 1.49 |

[6]Tall oil rosin, available from Arizona Chemical.

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (972.51 g) was dispersed in aqueous medium by adding it to a mixture of 27.58 g of sulfamic acid and 471.83 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 41.3 percent. The reaction product had Z average molecular weight of 16 728 (determined by gel permeation chromatography in DMF using polystyrene as a standard).

Example 7

|  |  | Mass (/g) |
|---|---|---|
| 1 | EPON 828 | 310.56 |
| 2 | gum rosin | 339.65 |
| 3 | ethyltriphenyl phosphonium iodide | 0.44 |
| 4 | methyl isobutyl ketone | 38.30 |
| 5 | Trimethylol propane | 7.39 |

-continued

|  |  | Mass (/g) |
|---|---|---|
| 6 | MDI | 42.76 |
| 7 | methyl isobutyl ketone | 48.59 |
| 8 | crosslinker | 268.23 |
| 9 | DETA diketimine | 19.56 |
| 10 | N-methyl ethanolamine | 3.92 |
| 11 | methyl isobutyl ketone | 1.48 |

Components 1-5 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 6 and 7 were added. The temperature dropped to 127° C. and was maintained for 30 minutes. 8 and 9 were added, followed one minute later by 10 and 11. After the exotherm, the temperature was adjusted to 116° C. and this temperature was maintained for two hours. The resin mixture (972.8 g) was dispersed in aqueous medium by adding it to a mixture of 27.34 g of sulfamic acid and 471.78 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 42.1 percent. The reaction product had Z average molecular weight of 44 382 (determined by gel permeation chromatography in DMF using polystyrene as a standard).

Example 8

|  |  | Mass (/g) |
|---|---|---|
| 1 | EPON 828 | 402.63 |
| 2 | CARDOLITE NC-700 (from Cardolite) | 388.62 |
| 3 | ethyltriphenyl phosphonium iodide | 0.54 |
| 4 | methyl isobutyl ketone | 31.47 |
| 5 | MDI | 47.47 |
| 6 | methyl isobutyl ketone | 35.82 |
| 7 | crosslinker | 345.20 |
| 8 | DETA diketimine | 26.97 |
| 9 | N-methyl ethanolamine | 5.40 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9. After the exotherm, the temperature was adjusted to 116° C. and this temperature was maintained for two hours. The resin mixture (577.9 g) was dispersed in aqueous medium by adding it to a mixture of 18.86 g of sulfamic acid and 309.14 g of deionized water warmed to 30° C. under vigorous agitation. After 30 minutes, 4.92 g of a 30% solution of gum rosin in butylcarbitol formal was added followed, 45 minutes later by 452.65 g of deionized water. The dispersion was thinned with more deionized water and vacuum stripped to remove organic solvent to give a dispersion having a solids content of 31.7 percent. The reaction product had Z average molecular weight of 22 620 (determined by gel permeation chromatography in DMF using polystyrene as a standard).

Example 9

The crosslinker was prepared from the following ingredients:

| INGREDIENTS | PARTS BY WEIGHT |
| --- | --- |
| Bis (hexamethylene) triamine[7] | 1938.51 |
| Propylene carbonate | 1840.68 |
| Methyl isobutyl ketone | 1619.65 |

[7]DYTEK BHMT-HP, available from Invista.

The bis(hexamethylene)triamine was charged to a reaction vessel and heated under a nitrogen atmosphere. The propylene carbonate was added over 3 hours. The reaction mixture exothermed to 68° C. and was then cooled and maintained at 60° C. The mixture was held at 60° C. for an additional 2 hours and then methyl isobutyl ketone was added.

Electrocoat Paint Example

This example describes the preparation of an electrodeposition bath composition of the present invention. The electrodeposition bath was prepared from a mixture of the following ingredients:

| INGREDIENTS | PARTS BY WEIGHT |
| --- | --- |
| Resin and deionized water | See table below |
| Plasticizer[8] | 8.3 |
| Flexibilizer[9] | 121.9 |
| Flow Additive[10] | 80.6 |
| ethylene glycol | 12.4 |
| propylene glycol monomethyl | 6.2 |
| pigment paste prepared as described below | 140.8 |

[8]MAZON-1651, a plasticizer based on butyl carbitol and formaldehyde, available from BASF.
[9]An aqueous dispersion of a flexibilizer/flow control agent generally in accordance with U.S. Pat. No. 4,423,166. The flexibilizer/flow control agent was prepared from a polyepoxide (EPON 828) and a polyoxyalkylenepolyamine (JEFFAMINE D2000 from Texaco Chemical Co.). The flexibilizer/flow control agent was dispersed in aqueous medium with the aid of lactic acid and the dispersion had a resin solids content of 34.6 percent by weight.
[10]A cationic microgel prepared as generally described in Examples A and B of U.S. Pat. No. 5,096,556, with the exception that acetic acid instead of lactic acid was used to disperse the soap of Example A, and EPON 828 solution was added after stripping rather than before in Example B. The resin had a final solids content of 17.9%.

| Cationic Dispersion | Dispersion Parts by Weight | De-ionized Water Parts by Weight |
| --- | --- | --- |
| Example 1 | 725.2 | 1304.5 |
| Example 2 | 872.7 | 1157.0 |
| Example 3 | 824.9 | 1204.7 |

The paint was made by adding the plasticizer, flexibilizer, flow additive, and solvents to the cationic dispersion under agitation. The blend was then reduced with 500 parts of the deionized water. The pigment paste was reduced with 300 parts of the deionized water, and then blended into the reduced resin mixture under agitation. The remainder of the deionized water was then added under agitation. Final bath solids were about 20%, with a pigment to resin ratio of 0.1 2:1.0. The paint was allowed to agitate at least two hours. Thirty percent of the total paint weight was removed by ultrafiltration and replaced with deionized water.

The pigment paste used above was prepared from a mixture of the following ingredients:

| INGREDIENTS | PARTS BY WEIGHT |
| --- | --- |
| Cationic grind resin[9] | 525.3 |
| SURFYNOL GA[10] | 1.4 |
| Catalyst paste | 175.3 |
| ASP-200[11] | 316.6 |
| CSX-333[12] | 4.3 |
| TRONOX CR800E[13] | 40.3 |
| Deionized water | 50.3 |

[9]As described in Example 2 of U.S. Pat. No. 4,715,898.
[10]Nonionic surfactant, available from Air Products and Chemicals, Inc.
[11]Aluminum silicate, available from Engelhard Corporation.
[12]Carbon black beads, available from Cabot Corp.
[13]Titanium dioxide pigment, available from Tronox Inc.

The above ingredients were added sequentially under high shear agitation. After the ingredients were thoroughly blended, the pigment paste was transferred to a vertical sand mill and ground to a Hegman value of about 7.25. The pigment paste was then collected. The measured solids were 55% following 1 hr @ 110° C.

The catalyst paste was prepared from a mixture of the following ingredients:

| INGREDIENTS | PARTS BY WEIGHT |
| --- | --- |
| Cationic grind resin[14] | 527.7 |
| n-Butoxypropanol | 6.9 |
| FASCAT 4201[15] | 312.0 |
| Deionized water | 59.8 |

[14]As described in Example 2 of U.S. Pat. No. 4,715,898, plus 2% by weight on solids of ICOMEEN T-2 (BASF).
[15]Available from Arkema, Inc.

The catalyst paste was prepared by sequentially adding the above ingredients under high shear agitation. After the ingredients were thoroughly blended, the pigment paste was transferred to a vertical sand mill and ground to a Hegman value of about 7.25. The catalyst paste was then collected. The measured solids were 51% following 1 hr @ 110° C.

Electrocoating Procedure:

Bath compositions prepared as described above were electrodeposited onto phosphated cold rolled steel panels, commercially available from ACT Laboratories. The phosphate, which is commercially available from PPG Industries, Inc., is CHEMFOS 700 with a deionized water rinse. Conditions for cationic electrodeposition were 2 minutes at 92° F., voltages are listed in the chart below, specific to each resin to yield a cured dry film thickness of about 0.80 mils. The electrocoated substrate was cured in an electric oven for 25 minutes at 350° F. The electrocoated panels were tested against a standard electrocoat product and the results are recorded in Table 1. The control product is ED-6280 available from PPG Industries Inc.

TABLE 1

|  | Paint prepared with dispersion of Example 1 | Paint prepared with dispersion of Example 2 | Paint prepared with dispersion of Example 3 | ED6280 Control Paint |
|---|---|---|---|---|
| Applied Voltage | 225 | 250 | 125 | 175 |
| Scribe creep - 20 cycles Corrosion Testing[16] | 3.0 mm Average scribe creep | 3.25 mm Average scribe creep | 4.0 mm Average scribe creep | 3.5 mm Average scribe creep |
| QCT humidity adhesion[17] | 10 | 10 | 10 | 10 |

[16] Each coated panel was scribed, cutting through the coating to the metal substrate in an X pattern. The test panels were then subjected to cyclic corrosion testing by rotating test panels through a salt solution, room temperature dry, and humidity and low temperature in accordance with General Motors test method, GM TM 54-26. Scribe creep is reported as the maximum width (in millimeters) of corrosion across the scribe mark.

[17] Crosshatch adhesion performed after condensing humidity exposure for 16 hours at 140° F. on a QCT condensation tester (Q-Panel Company, Cleveland, OH). A rating of 10 indicates no adhesion failure.

The above results demonstrate that the compositions of the invention have similar properties to a standard market acceptable electrocoat.

Whereas particular embodiments of this invention have been described above for purposes of illustration, it will be evident to those skilled in the art that numerous variations of the details of the present invention may be made without departing from the invention as defined in the appended claims.

Therefore we claim:

1. A modified epoxy resin comprising the epoxy functional reaction product of resin and an epoxy resin further reacted with a compound having one or more hydroxy reactive groups, wherein the compound having one or more hydroxy reactive groups comprises polyisocyanate.

2. The polymer of claim 1, wherein the epoxy resin comprises the diglycidyl ether of bisphenol A.

3. The modified epoxy resin of claim 1, wherein the polyisocyanate comprises monomeric diphenylmethane diisocyanate and/or polymeric diphenylmethane diisocyanate.

4. An aqueous dispersion comprising the resin of claim 1.

5. A coating comprising the modified epoxy resin of claim 1, wherein the coating is not an cationic electrodepositable coating.

6. The coating of claim 5, wherein the coating comprises a colorant.

7. The coating of claim 5, wherein the coating is substantially clear.

8. The coating of claim 5, wherein the coating is a two component coating, and the modified epoxy resin is in one component and a curing agent for the modified epoxy rosin is in another component.

* * * * *

UNITED STATES PATENT AND TRADEMARK OFFICE
CERTIFICATE OF CORRECTION

Page 1 of 1

PATENT NO. : 7,812,101 B2
APPLICATION NO. : 11/780867
DATED : October 12, 2010
INVENTOR(S) : David Fenn et al.

It is certified that error appears in the above-identified patent and that said Letters Patent is hereby corrected as shown below:

Cover Page
OTHER PUBLICATIONS
Mustata, Fanica et al., "...restin..." --- should be --- "...resin..."

In the Claims
Claim 1
Column 18, Line 6
"...reaction product of resin..." --- should be --- "...reaction product of rosin..."

Claim 2
Column 18, Line 10
"The polymer of..." --- should be --- "The resin of..."

Claim 8
Column 18, Line 25
"...the modified epoxy rosin..." --- should be --- "...the modified epoxy resin..."

Signed and Sealed this
Third Day of July, 2012

David J. Kappos
*Director of the United States Patent and Trademark Office*